United States Patent
Singh et al.

(10) Patent No.: US 9,307,419 B1
(45) Date of Patent: Apr. 5, 2016

(54) DATA TRANSMISSION THROUGHPUT FOR A WIRELESS ACCESS NODE

(71) Applicant: Sprint Communications Company L.P., Overland Park, KS (US)

(72) Inventors: Jasinder Pal Singh, Olathe, KS (US); Maulik K. Shah, Overland Park, KS (US); Sandeep Goyal, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 161 days.

(21) Appl. No.: 13/789,146

(22) Filed: Mar. 7, 2013

(51) Int. Cl.
*H04J 3/22* (2006.01)
*H04B 3/36* (2006.01)
*H04W 24/02* (2009.01)

(52) U.S. Cl.
CPC ...................................... *H04W 24/02* (2013.01)

(58) Field of Classification Search
CPC ... H04W 24/02; H04W 52/545; H04W 52/48; H04L 1/18; H04L 25/05; H04L 12/66; H04J 3/22
USPC .......................................... 370/241, 469, 474
See application file for complete search history.

(56) References Cited

U.S. PATENT DOCUMENTS

| | | | |
|---|---|---|---|
| 2004/0141523 A1* | 7/2004 | Bhushan et al. | 370/469 |
| 2005/0249244 A1* | 11/2005 | McNamara et al. | 370/474 |
| 2007/0274342 A1* | 11/2007 | Kim et al. | 370/473 |
| 2008/0080472 A1* | 4/2008 | Bertrand et al. | 370/344 |
| 2008/0139113 A1* | 6/2008 | Ho et al. | 455/7 |
| 2009/0098876 A1* | 4/2009 | Khan et al. | 455/445 |
| 2010/0124186 A1* | 5/2010 | Josiam et al. | 370/315 |
| 2010/0131817 A1* | 5/2010 | Kong et al. | 714/749 |
| 2010/0322177 A1* | 12/2010 | Luo et al. | 370/329 |
| 2012/0189023 A1* | 7/2012 | Huang et al. | 370/477 |

OTHER PUBLICATIONS

Markku Kuusela, et al.; "Chapter 10: Radio Access Network VoIP Optimization and Performance on 3GPP HSPA/LTE;" Long Term Evolution: 3GPP LTE Radio and Cellular Technology; 2009; pp. 319-363; Taylor & Francis Group, LLC.

* cited by examiner

*Primary Examiner* — Edan Orgad
*Assistant Examiner* — Vanneilian Lalchinthang

(57) ABSTRACT

A wireless access node to improve data transmission throughput comprises a wireless communication transceiver and a processing system. The wireless access node transmits a first data packet comprising a preamble for delivery to a wireless communication device during a first timeslot, monitors for a response transmitted from the wireless communication device during a predetermined number of timeslots, and if the response transmitted from the wireless communication device is not received during the predetermined number of timeslots, modify the preamble to generate a modified preamble, retransmit the first data packet with the modified preamble for delivery to the wireless communication device during a second timeslot, and if an acknowledgement of receipt of the first data packet with the modified preamble is received from the wireless communication device during the predetermined number of timeslots, transmit a second data packet for delivery to the wireless communication device during a third timeslot.

8 Claims, 5 Drawing Sheets

DATA TRANSMISSION THROUGHPUT FOR A WIRELESS ACCESS NODE

TECHNICAL BACKGROUND

Wireless communication devices transmit and receive information wirelessly via a wireless access node to communicate over a communication network. Typically, the wireless access node is part of a radio access network (RAN) which provides the wireless communication devices with access to further communication networks, systems, and devices. The wireless communication devices utilize forward link communication channels to receive voice and/or data transmitted from the wireless access node, and reverse link communication channels to transmit information up to the node.

Given the nature of transmitting information in the form of energy over the air, errors can be introduced while the data is in-route to its destination. These errors can be introduced from a variety of factors, such as environmental obstructions, distance between a sender and receiver, strength of the signal being transmitted, and others. In some cases, the intended recipient of a data transmission may not even receive the data whatsoever. To address these concerns, error control techniques for data transmissions may be utilized to achieve reliable data transmissions over an unreliable service. One such technique, termed hybrid automatic repeat request (HARQ), provides such error control by encoding data with a forward error correction (FEC) code. In addition to the FEC code, the sender may transmit parity bits to assist in recovering erroneous data, which may be sent either immediately or only transmitted upon request when a receiver detects an erroneous message.

OVERVIEW

A method of operating a wireless access node to improve data transmission throughput is disclosed. The method comprises transmitting a first data packet for delivery to a wireless communication device during a first timeslot, wherein the first data packet comprises a preamble that indicates the first data packet is meant for the wireless communication device. The method further comprises monitoring for a response transmitted from the wireless communication device during a predetermined number of timeslots. The method further comprises, if the response transmitted from the wireless communication device is not received during the predetermined number of timeslots, modifying the preamble to generate a modified preamble and retransmitting the first data packet with the modified preamble for delivery to the wireless communication device during a second timeslot. The method further comprises, if an acknowledgement of receipt of the first data packet with the modified preamble is received from the wireless communication device during the predetermined number of timeslots, transmitting a second data packet for delivery to the wireless communication device during a third timeslot.

A wireless access node to improve data transmission throughput comprises a wireless communication transceiver and a processing system. The wireless communication transceiver is configured to transmit a first data packet for delivery to a wireless communication device during a first timeslot, wherein the first data packet comprises a preamble that indicates the first data packet is meant for the wireless communication device. The processing system is configured to monitor for a response transmitted from the wireless communication device during a predetermined number of timeslots, and if the response transmitted from the wireless communication device is not received during the predetermined number of timeslots, modify the preamble to generate a modified preamble and direct the wireless communication transceiver to retransmit the first data packet with the modified preamble for delivery to the wireless communication device during a second timeslot. The wireless communication transceiver is configured to, if an acknowledgement of receipt of the first data packet with the modified preamble is received from the wireless communication device during the predetermined number of timeslots, transmit a second data packet for delivery to the wireless communication device during a third timeslot.

A computer apparatus improve data transmission throughput of a wireless access node is disclosed. The computer apparatus comprises software instructions and at least one non-transitory computer-readable storage medium storing the software instructions. The software instructions are configured, when executed by a the wireless access node, to direct the wireless access node to transmit a first data packet for delivery to a wireless communication device during a first timeslot, wherein the first data packet comprises a preamble that indicates the first data packet is meant for the wireless communication device. The software instructions are further configured to direct the wireless access node to monitor for a response transmitted from the wireless communication device during a predetermined number of timeslots. The software instructions are further configured to direct the wireless access node to, if the response transmitted from the wireless communication device is not received during the predetermined number of timeslots, modify the preamble to generate a modified preamble and retransmit the first data packet with the modified preamble for delivery to the wireless communication device during a second timeslot. The software instructions are further configured to direct the wireless access node to, if an acknowledgement of receipt of the first data packet with the modified preamble is received from the wireless communication device during the predetermined number of timeslots, transmit a second data packet for delivery to the wireless communication device during a third timeslot.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
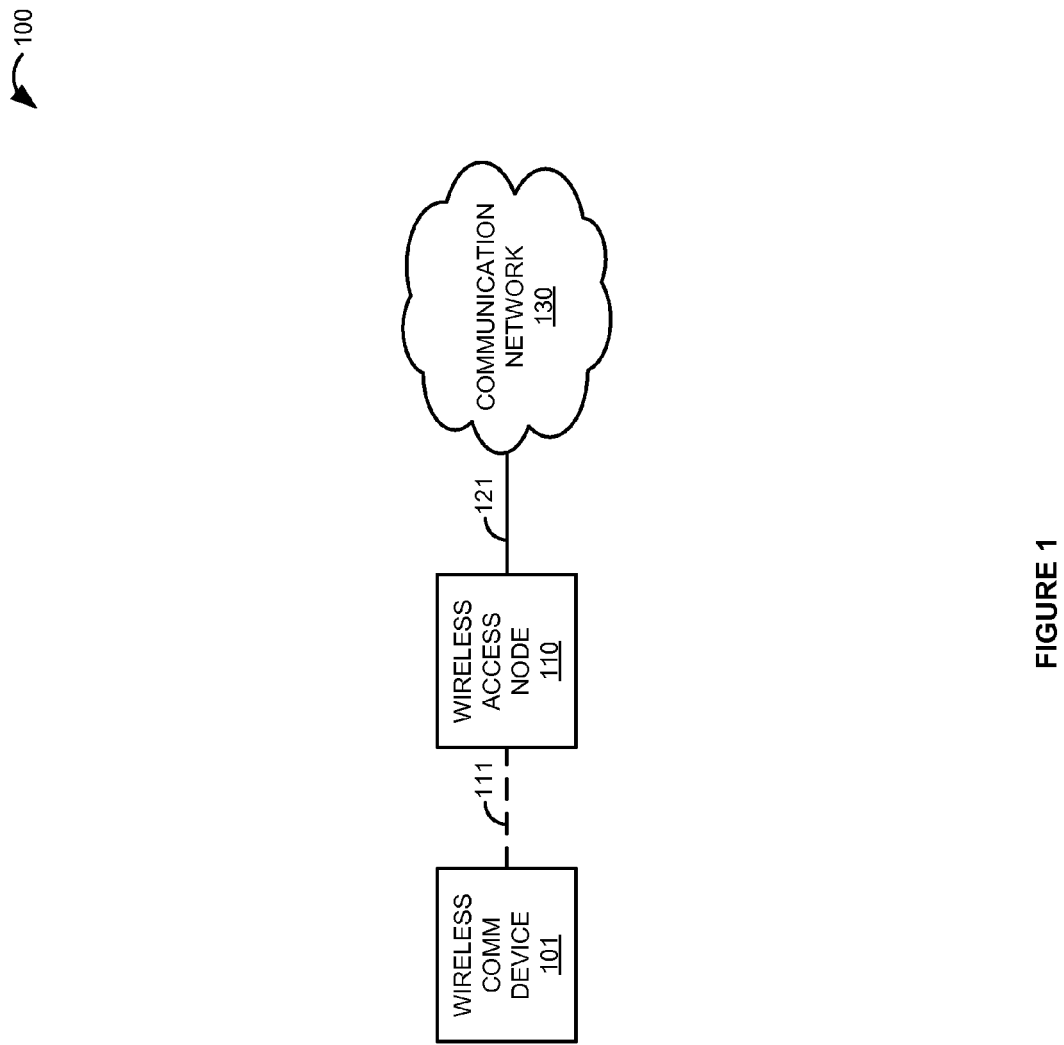
FIG. 1 is a block diagram that illustrates a communication system.

FIG. 1 is a block diagram that illustrates communication system 100. Communication system 100 includes wireless communication device 101, wireless access node 110, and communication network 130. Wireless communication device 101 and wireless access node 110 are in communication over wireless communication link 111. Wireless access node 110 and communication network 130 communicate over communication link 121.

Figure 2:
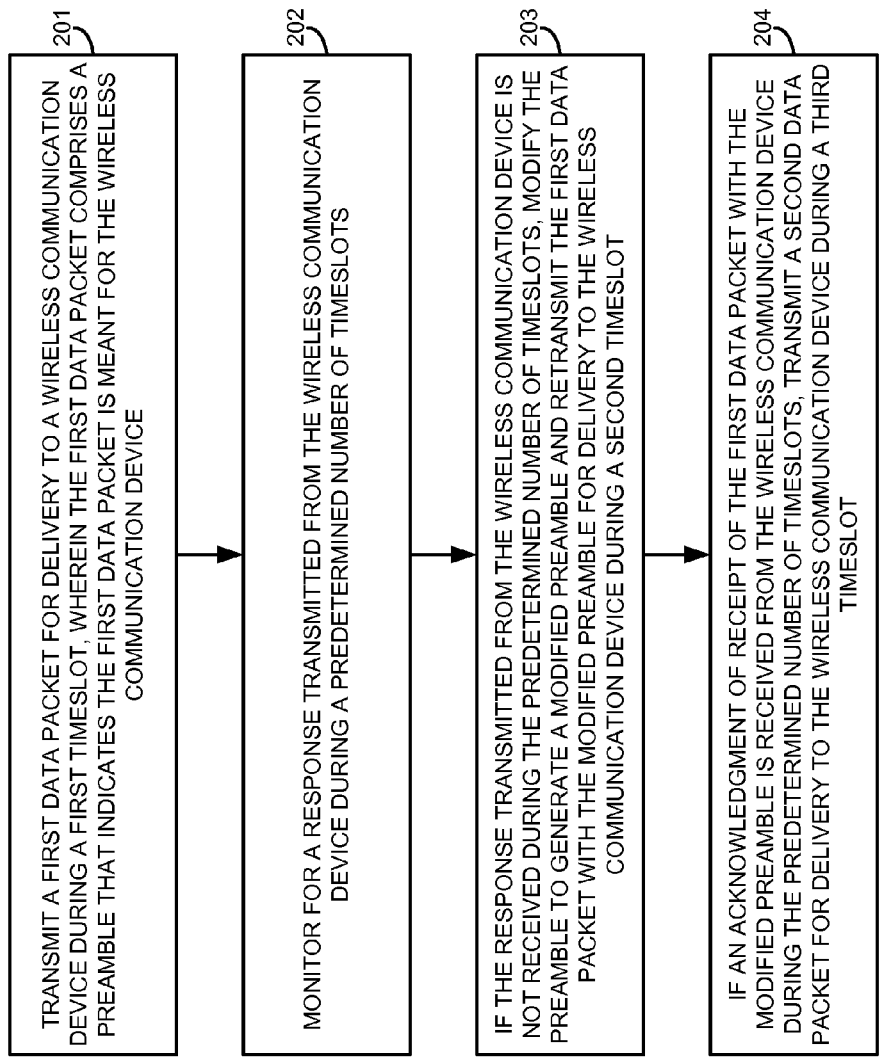
FIG. 2 is a flow diagram that illustrates an operation of the communication system.

FIG. 2 is a flow diagram that illustrates an operation of communication system 100. The steps of the operation are indicated below parenthetically. The operation of communication system 100 shown in FIG. 2 may be employed by wireless access node 110 to improve data transmission throughput to wireless communication device 101 on a forward link channel.

To begin, wireless access node 110 transmits a first data packet for delivery to wireless communication device 101 during a first timeslot, wherein the first data packet comprises a preamble that indicates the first data packet is meant for wireless communication device 101 (201). Typically, the first timeslot is allocated to wireless communication device 101 by wireless access node 110 for use in transmitting the first data packet. When an entire packet is too large to fit into a single timeslot, wireless access node 110 will typically subdivide the packet into a number of smaller coded packets. Thus, in some examples, the first data packet could comprise an entire packet or just a portion of a packet that has been subdivided by wireless access node 110 using a coding algorithm to generate a number of coded packets from the original larger packet. Wireless access node 110 appends a preamble to the beginning of the first data packet. The preamble typically comprises a sequence of bits that is repeated at least once depending on the data transmission rate. In some examples, the preamble comprises a media access control (MAC) identifier that indicates the first data packet is meant for wireless communication device 101.

After transmitting the first data packet for delivery to wireless communication device 101, wireless access node 110 monitors for a response transmitted from wireless communication device 101 during a predetermined number of timeslots (202). Typically, the response expected by wireless access node 110 comprises either an acknowledgement (ACK) or negative acknowledgement (NAK) message transmitted by wireless communication device 101. The predetermined number of timeslots during which wireless access node 110 monitors for the response is typically based on the slot interlacing pattern employed by node 110. The number of predetermined timeslots that wireless access node 110 monitors for the response from wireless communication device 101 is typically less than the number of the slot interlacing pattern. For example, in a four slot interlacing pattern, every fourth timeslot would be reserved for transmission of data packets to wireless communication device 101, such that data would be transmitted to device 101 on timeslots one, five, nine, thirteen, and so forth, and thus wireless access node 110 could wait for a response from device 101 for up to three timeslots before the next timeslot reserved for transmission to device 101 occurs.

If the response transmitted from wireless communication device 101 is not received during the predetermined number of timeslots, wireless access node 110 modifies the preamble to generate a modified preamble and retransmits the first data packet with the modified preamble for delivery to wireless communication device 101 during a second timeslot (203). In other words, if wireless communication device 101 fails to respond to the first data packet transmission during the predetermined number of timeslots that wireless access node 110 is monitoring for a response, wireless access node 110 retransmits the first data packet with a modified preamble during a second timeslot. The second timeslot would typically be the next timeslot reserved for transmission to wireless communication device 101. For example, in the four slot interlacing pattern described above, wireless access node 110 could initially transmit the first data packet with the original preamble during timeslot one, wait for a response from wireless communication device 101 during timeslots two through four, and if no response is received during those timeslots, then retransmit the first data packet with the modified preamble to wireless communication device 101 during timeslot five.

Wireless access node 110 could generate the modified preamble for the first data packet in a variety of ways. In some examples, wireless access node 110 could generate the modified preamble by reducing a modulation rate for the original preamble of the first data packet to generate the modified preamble. Additionally or alternatively, wireless access node 110 could generate the modified preamble by increasing a coding for the preamble to generate the modified preamble. For example, wireless access node 110 could increase the coding for the preamble by increasing a redundancy of the original preamble to generate the modified preamble. In some examples, the modified preamble comprises a greater number of bits than the original preamble. Other techniques of modifying the preamble to generate the modified preamble for the first data packet are possible and within the scope of this disclosure.

If an acknowledgement of receipt of the first data packet with the modified preamble is received from wireless communication device 101 during the predetermined number of timeslots, wireless access node 110 transmits a second data packet for delivery to wireless communication device 101 during a third timeslot (204). In other words, if wireless communication device 101 responds to the first data packet with the modified preamble during the predetermined number of timeslots, wireless access node 110 transmits a second data packet to wireless communication device 101 during a third timeslot. The third timeslot would typically be the next timeslot reserved for transmission to wireless communication device 101. For example, in the four slot interlacing pattern described above, if wireless access node 110 retransmits the first data packet with the modified preamble during timeslot five, and receives an acknowledgement of receipt of the first data packet sometime during timeslots six through eight, then wireless access node 110 would transmit a second data packet to wireless communication device 101 during timeslot nine. Typically, the second data packet does not include the preamble.

The acknowledgement of receipt of the first data packet with the modified preamble typically comprises either an acknowledgement (ACK) or negative acknowledgement (NAK) message transmitted by wireless communication device 101. The second data packet transmitted by wireless access node 110 in response to the acknowledgement of receipt could comprise different data and/or comprise a different format depending on whether an ACK or a NAK message is received. For example, wireless access node 110 might send the next packet intended for wireless communication device 101 as a higher-redundancy packet with no preamble for the second data packet in the third timeslot if a NAK is received from device 101 in response to receiving the first data packet. In the case of receiving an ACK message from wireless communication device 101 in response to sending device 101 the first data packet, wireless access node 110 might start with a new data packet with early termination for transmitting the second data packet in the third timeslot in some examples. Other data and formats for the second data packet are possible and within the scope of this disclosure.

Advantageously, wireless access node 110 monitors for a response from wireless communication device 101 after sending a first data packet comprising a preamble to ensure that device 101 actually acknowledges receipt of the first data packet. If no response is received, wireless access node 110 retransmits the first data packet with a modified preamble instead of transmitting additional packets in the sequence without a preamble that device 101 will not be able to interpret and use if the first data packet with the preamble was not successfully communicated to wireless communication device 101. In this manner, overall sector throughput is improved, resulting in increased data throughput as perceived by the user of wireless communication device 101, thereby enhancing the user's experience.

Referring back to FIG. 1, wireless communication device 101 comprises any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 101 may also include a user interface, memory system, software, processing circuitry, or some other communication components. For example, wireless communication device 101 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication device 101 include Code Division Multiple Access (CDMA) 1×RTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long Term Evolution (3GPP LTE), LTE Advanced, Worldwide Interoperability for Microwave Access (WiMAX), IEEE 802.11 protocols (Wi-Fi), Bluetooth, Internet, telephony, or any other wireless network protocol that facilitates communication between wireless communication device 101 and wireless access node 110.

Wireless access node 110 comprises RF communication circuitry and an antenna. The RF communication circuitry typically includes an amplifier, filter, RF modulator, and signal processing circuitry. Wireless access node 110 may also comprise a router, server, memory device, software, processing circuitry, cabling, power supply, network communication interface, structural support, or some other communication apparatus. Wireless access node 110 could comprise a base station, Internet access node, telephony service node, wireless data access point, or some other wireless communication system—including combinations thereof. Some examples of wireless access node 110 include a base transceiver station (BTS), base station controller (BSC), radio base station (RBS), Node B, enhanced Node B (eNodeB), and others—including combinations thereof. Wireless network protocols that may be utilized by wireless access node 110 include CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof.

Communication network 130 comprises the core network of a wireless communication service provider, and could include routers, gateways, telecommunication switches, servers, processing systems, or other communication equipment and systems for providing communication and data services. Communication network 130 could comprise wireless communication nodes, telephony switches, Internet routers, network gateways, computer systems, communication links, or some other type of communication equipment—including combinations thereof. Communication network 130 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Communication network 130 may be configured to communicate over metallic, wireless, or optical links—including combinations thereof. Communication network 130 may be configured to use time-division multiplexing (TDM), Internet Protocol (IP), Ethernet, optical networking, wireless protocols, communication signaling, or some other communication format—including combinations thereof. In some examples, communication network 130 includes further access nodes and associated equipment for providing communication services to many wireless communication devices across a large geographic region.

Wireless communication link 111 uses the air or space as the transport medium. Wireless communication link 111 may use various protocols, such as CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof. Wireless communication link 111 may comprise many different signals sharing the same link. For example, wireless communication link 111 could include multiple signals operating in a single propagation path comprising multiple communication sessions, frequencies, timeslots, transportation ports, logical transportation links, network sockets, IP sockets, packets, or communication directions—including combinations thereof.

Communication link 121 uses metal, air, space, optical fiber such as glass or plastic, or some other material as the transport medium—including combinations thereof. Communication link 121 could use various communication protocols, such as TDM, IP, Ethernet, telephony, optical networking, hybrid fiber coax (HFC), communication signaling, wireless protocols, or some other communication format—including combinations thereof. Communication link 121 may be a direct link or could include intermediate networks, systems, or devices.

Figure 3:
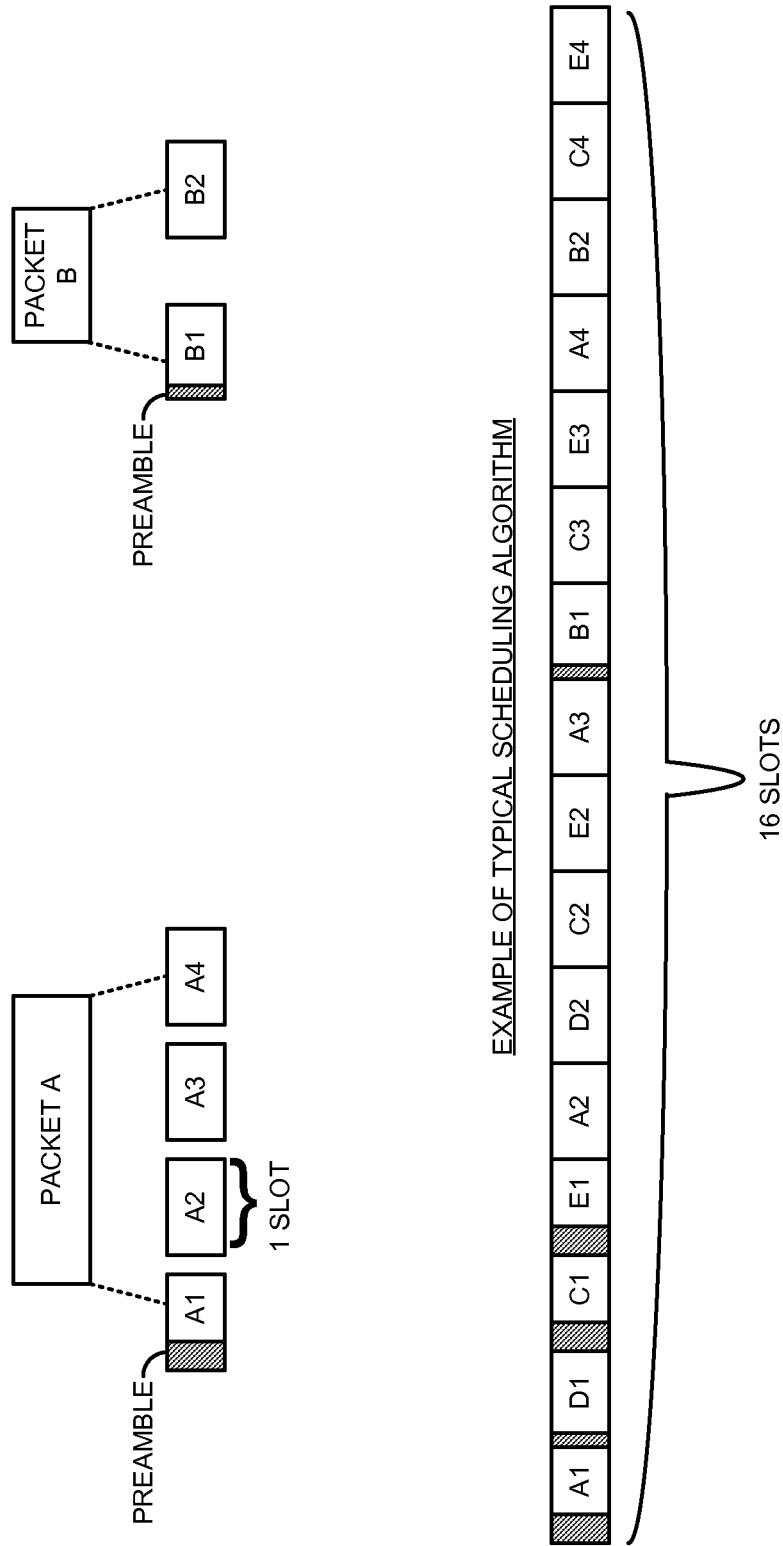
FIG. 3 is a block diagram that illustrates exemplary packet codings and a series of timeslots in a typical scheduling algorithm.

FIG. 3 is a block diagram that illustrates exemplary packet codings and a series of timeslots in a typical scheduling algorithm. In this example, packet A is broken up into four coded packets A1, A2, A3, and A4, while packet B is encoded into coded packets B1 and B2. Each coded packet A1-A4 and B1-B2 represents a single timeslot as indicated on FIG. 3, which in this example is set to 1.667 milliseconds which equals 2048 chips, but the timeslot length could be different in other examples.

As shown by the grey shading on coded packets A1 and B1 of respective packets A and B in FIG. 3, a sequence of preamble bits is appended to the beginning of each coded packet A1 and B1 to assist a wireless communication device in synchronizing to variable data rates. The preamble sequence is typically covered by a 32-chip bi-orthogonal sequence, which is repeated at least once depending on the transmission data rate. For example, to provide a 1024-chip preamble length required for a 38.4 kilobits per second data rate, the 32-chip preamble sequence would be repeated 32 times. In the example of FIG. 3, the preamble appended to coded packet A1 is visible larger than the preamble appended to coded packet B1. The larger preamble of coded packet A1 will take longer to transmit than the relatively smaller preamble of coded packet B1.

The preamble chips are inserted within the data portion of the slot clock period prior to the start of the packet transmission. For example, packet A is encoded using incremental redundancy to produce coded packets A1-A4. Coded packet A1 has the preamble containing a media access control (MAC) identifier of a particular wireless communication device to which the packets are directed. When coded packet A1 is transmitted, timeslots five, nine, and thirteen would be reserved for transmission of coded packets A2, A3, and A4, respectively, based on a four slot interlacing pattern as shown in the example of the typical scheduling algorithm at the bottom of FIG. 3. If the wireless communication device having the MAC ID indicated in the preamble of the first coded packet A1 is unable to read or decode the first coded packet which has the preamble, it would not be aware that the packets A1-A4 are meant for it. However, under the typical scheduling algorithm, the base station would continue sending coded packets A2-A4 at their respective timeslots. Since coded packets A2-A4 do not contain the preamble, the wireless communication device would not be aware that those packets are intended for it since it was unable to read and decode the first coded packet A1 containing the preamble. Thus, the packets A2-A4 would be discarded, and the timeslots used to transmit packets A2-A4, namely timeslots five, nine, and thirteen, would be wasted, resulting in a reduction in overall sector throughput.

Figure 4:
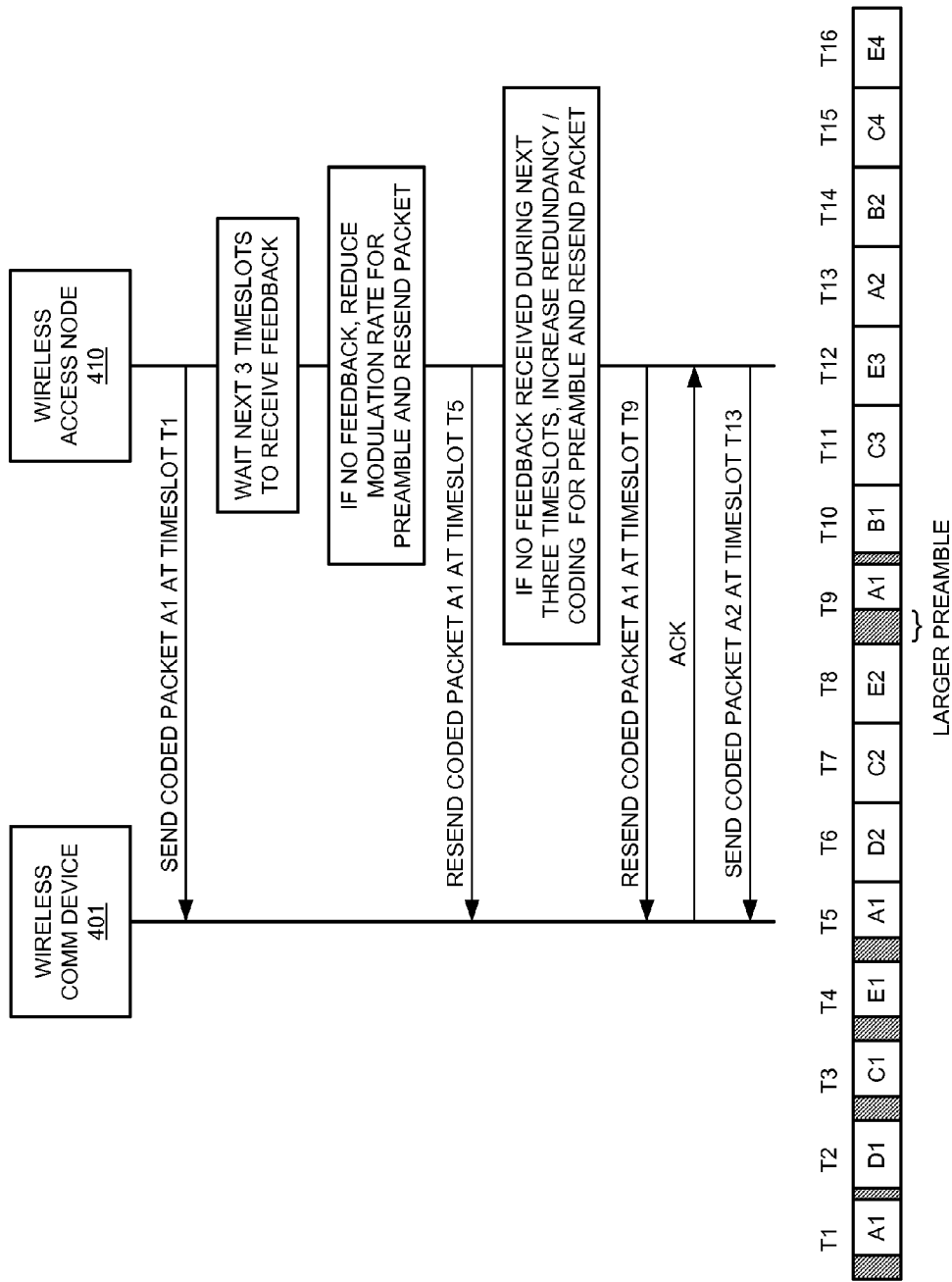
FIG. 4 is a sequence diagram that illustrates an operation of a wireless access node along with a corresponding series of timeslots in an exemplary embodiment.

FIG. 4 is a sequence diagram that illustrates an operation of wireless access node 410 along with a corresponding series of timeslots in an exemplary embodiment. The operation of wireless access node 410 addresses the problem described above with respect to FIG. 3. The operation of wireless access node 410 would typically be implemented as a scheduling algorithm for a radio access network that employs hybrid automatic repeat request (HARQ) coding, but could be used to enhance any technology that only sends a preamble with a first data packet.

To begin, wireless access node 410 sends a first coded packet A1 at timeslot T1 to wireless communication device 401, which can be seen in the corresponding series of timeslots at the bottom of FIG. 4. In this example, a four slot interlacing pattern is employed, so wireless access node 410 waits for the next three timeslots to receive feedback from wireless communication device 401. The feedback expected would typically be sent in the form of an ACK or a NAK by wireless communication device 401. If wireless access node 410 does not receive any feedback from device 401, it would not send packet A2 in timeslot T5 as would be done under the typical scheduling algorithm discussed above with respect to FIG. 3. Instead, wireless access node 410 might reduce the modulation rate for the preamble of coded packet A1 and resend packet A1 along with the preamble having the reduced modulation rate at timeslot T5. Reducing the modulation rate of the preamble may result in a longer transmission time for the coded packet A1 with the lower modulation rate preamble, but may provide wireless communication device 401 a better chance at receiving and decoding the preamble than the first attempt that failed.

After resending the coded packet A1 at timeslot T5 with the modified preamble having the reduced modulation rate, wireless access node 410 again monitors during the next three timeslots for feedback from wireless communication device 401. If no feedback is received from device 401, such as an ACK or a NAK message, then wireless access node 410 may increase the redundancy or coding for the preamble. Wireless access node 410 then resends the packet A1 with the preamble having increased redundancy at the next reserved timeslot for wireless communication device 401, which is timeslot T9 in this example. The increased redundancy or coding for the preamble of packet A1 may result in a larger preamble than the original preamble sent with packet A1 at timeslot T1, as shown at timeslot T9 in the corresponding series of timeslots at the bottom of FIG. 4.

Wireless access node 410 again monitors for a response from wireless communication device 401 during the next three timeslots. In this example, wireless communication device 401 finally receives and interprets the third attempt to send packet A1 at timeslot T9 with the increased redundancy preamble. Wireless communication device 401 thus acknowledges receipt of packet A1 by transmitting an ACK message that is received by wireless access node 410. In response to receiving the ACK message, wireless access node 410 would transmit the second coded packet A2 with no preamble at timeslot T13 with early termination. Alternatively, in the case of receiving a NAK message in response to the third attempt to send packet A1 at timeslot T9 with the increased redundancy preamble (not shown in FIG. 4), wireless access node 410 would continue by sending a higher redundancy coded packet A2 with no preamble at timeslot T13. In any case, timeslots T5, T9, and T13 that were reserved for transmission to wireless communication device 401 are not wasted like they would be in the typical scheduling algorithm of FIG. 3 when the device fails to read and decode the first transmission of coded packet A1 having the original preamble at timeslot T1. In this manner, the user of wireless communication device 401 perceives an improvement in data throughput, while overall sector throughput is improved by not wasting timeslots to transmit data packets that their intended recipient will fail to interpret. The above technique could be used in any Evolution-Data Optimized (EV-DO) radio access network or any other technology that uses HARQ and/or that only sends a preamble with a first data packet.

Figure 5:
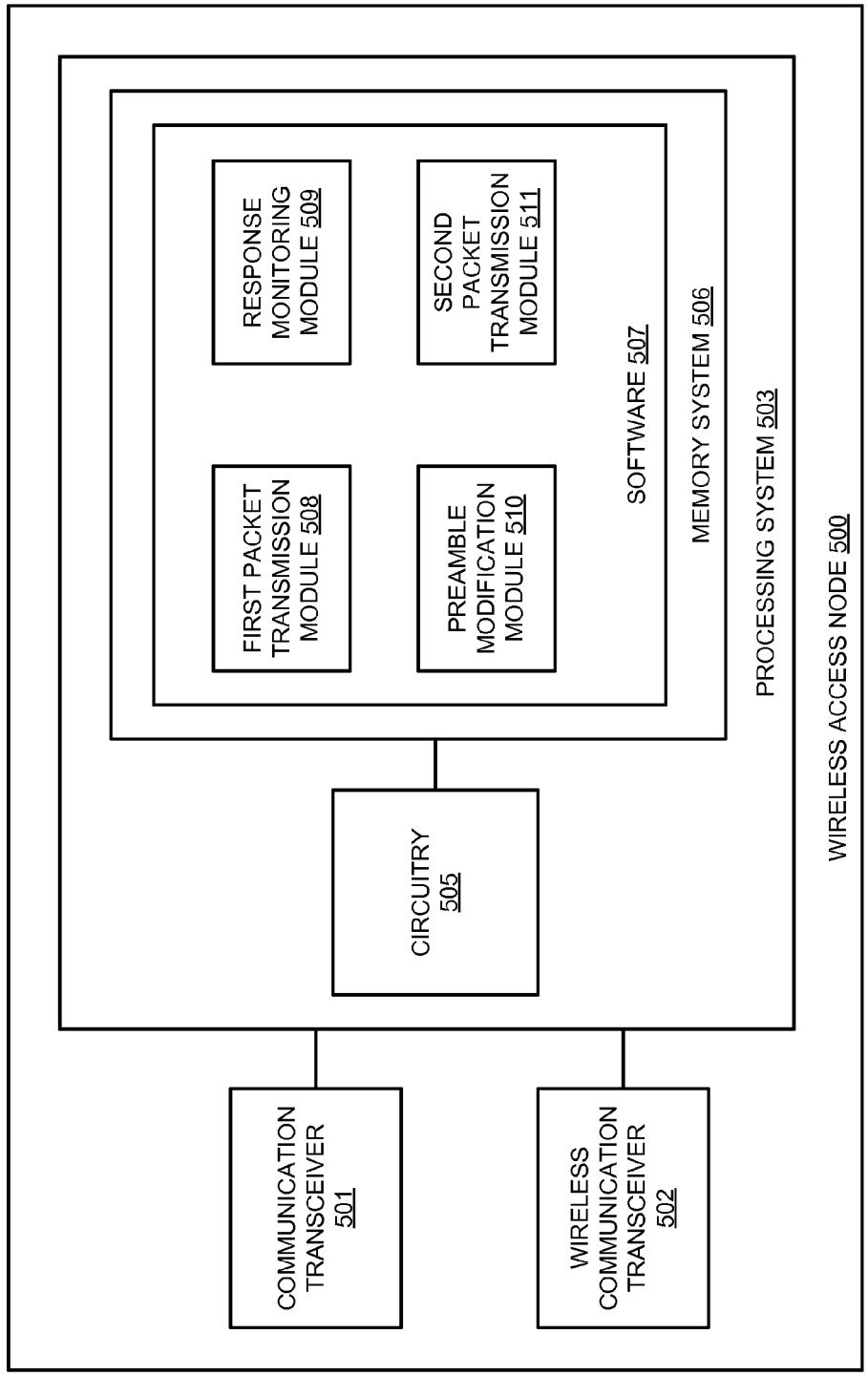
FIG. 5 is a block diagram that illustrates a wireless access node.

FIG. 5 is a block diagram that illustrates wireless access node 500. Wireless access node 500 provides an example of wireless access nodes 110 and 410, although nodes 110 and 410 may have alternative configurations. Wireless access node 500 comprises communication transceiver 501, wireless communication transceiver 502, and processing system 503. Processing system 503 is linked to communication transceiver 501 and wireless communication transceiver 502. Processing system 503 includes processing circuitry 505 and memory system 506 that stores operating software 507. Operating software 507 comprises software modules 508-511.

Communication transceiver 501 comprises components that communicate over communication links, such as network cards, ports, RF transceivers, processing circuitry and software, or some other communication components. Communication transceiver 501 may be configured to communicate over metallic, wireless, or optical links. Communication transceiver 501 may be configured to use TDM, IP, Ethernet, optical networking, wireless protocols, communication signaling, or some other communication format—including combinations thereof.

Wireless communication transceiver 502 comprises RF communication circuitry and an antenna. The RF communication circuitry typically includes an amplifier, filter, RF modulator, and signal processing circuitry. Wireless communication transceiver 502 may also include a memory system, software, processing circuitry, or some other communication device. Wireless communication transceiver 502 may use various protocols, such as CDMA, GSM, UMTS, HSPA, EV-DO, EV-DO rev. A, B, and C, 3GPP LTE, WiMAX, Wi-Fi, Bluetooth, Internet, telephony, or some other wireless communication format. Wireless communication transceiver 502 could be configured to transmit a first data packet for delivery to a wireless communication device during a first timeslot, wherein the first data packet comprises a preamble that indicates the first data packet is meant for the wireless communication device. Wireless communication transceiver 502 could also be configured to transmit a second data packet for delivery to the wireless communication device during a third timeslot.

Processing circuitry 505 comprises microprocessor and other circuitry that retrieves and executes operating software 507 from memory system 506. Processing circuitry 505 may comprise a single device or could be distributed across multiple devices—including devices in different geographic areas. Processing circuitry 505 may be embedded in various types of equipment. Memory system 506 comprises a non-transitory computer readable storage medium, such as a disk drive, flash drive, data storage circuitry, or some other hardware memory apparatus. Memory system 506 may comprise a single device or could be distributed across multiple devices—including devices in different geographic areas. Memory system 506 may be embedded in various types of equipment. In some examples, a computer apparatus could comprise memory system 506 and operating software 507. Operating software 507 comprises computer programs, firmware, or some other form of machine-readable processing instructions. Operating software 507 may include an operating system, utilities, drivers, network interfaces, applications, or some other type of software. In this example, operating software 507 comprises software modules 508-511, although software 507 could have alternative configurations in other examples.

When executed by circuitry 505, operating software 507 directs processing system 503 to operate as described herein for wireless access node 110. In particular, operating software 507 may direct processing system 503 to direct wireless communication transceiver 502 to transmit a first data packet for delivery to a wireless communication device during a first timeslot, wherein the first data packet comprises a preamble that indicates the first data packet is meant for the wireless communication device. Operating software 507 directs processing system 503 to monitor for a response transmitted from the wireless communication device during a predetermined number of timeslots. Operating software 507 further directs processing system 503 to, if the response transmitted from the wireless communication device is not received during the predetermined number of timeslots, modify the preamble to generate a modified preamble and retransmit the first data packet with the modified preamble for delivery to the wireless communication device during a second timeslot. Finally, if an acknowledgement of receipt of the first data packet with the modified preamble is received from the wireless communication device during the predetermined number of timeslots, operating software 507 directs processing system 503 to direct wireless communication transceiver 502 to transmit a second data packet for delivery to the wireless communication device during a third timeslot.

In this example, operating software 507 comprises a first packet transmission software module 508 that transmits a first data packet for delivery to a wireless communication device during a first timeslot, wherein the first data packet comprises a preamble that indicates the first data packet is meant for the wireless communication device. In addition, operating software 507 comprises a response monitoring software module 509 that monitors for a response transmitted from the wireless communication device during a predetermined number of timeslots. Operating software 507 also comprises a preamble modification software module 510 that, if the response transmitted from the wireless communication device is not received during the predetermined number of timeslots, modifies the preamble to generate a modified preamble and retransmits the first data packet with the modified preamble for delivery to the wireless communication device during a second timeslot. Finally, operating software 507 comprises a second packet transmission software module 511 that, if an acknowledgement of receipt of the first data packet with the modified preamble is received from the wireless communication device during the predetermined number of timeslots, transmits a second data packet for delivery to the wireless communication device during a third timeslot.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless access node to wirelessly transmit user data to a wireless communication device, the method comprising:
    separating the user data into a first Hybrid Automatic Repeat Request (HARQ) packet and a second HARQ packet;
    wirelessly transmitting the first HARQ packet with a preamble at a first modulation rate during a first HARQ time slot in a first HARQ frame;
    if a Negative Acknowledgement (NACK) is received from the wireless communication device for the first HARQ packet, then wirelessly retransmitting the first HARQ packet having the preamble at a second modulation rate that is lower than the first modulation rate during a first HARQ time slot in a second HARQ frame and not wirelessly retransmitting the first HARQ packet during the first HARQ frame; and
    if an Acknowledgement (ACK) is received from the wireless communication device for the first HARQ packet, then wirelessly transmitting the second HARQ packet without any preamble during the first HARQ time slot in the second HARQ frame and not wirelessly retransmitting the second HARQ packet during the second HARQ frame.

2. The method of claim 1 further comprising, if the ACK is received from the wireless communication device for the first HARQ packet, then separating additional user data into additional HARQ packets and wirelessly transmitting the additional HARQ packets without any preamble during first HARQ time slots in additional HARQ frames and not wirelessly retransmitting same ones of the additional HARQ packets during same ones of the additional HARQ frames.

3. The method of claim 2 further comprising, if the ACK is received from the wireless communication device for the first HARQ packet having the preamble at a second modulation rate that is lower than the first modulation rate during a first HARQ time slot in a second HARQ frame, then separating additional user data into additional HARQ packets and wirelessly transmitting the additional HARQ packets without any preamble during first HARQ time slots in additional HARQ frames and not wirelessly retransmitting same ones of the additional HARQ packets during same ones of the additional HARQ frames.

4. The method of claim 3 wherein the wireless access node comprises a Long Term Evolution (LTE) network access node.

5. A wireless access node to wirelessly transmit user data to a wireless communication device comprising:
 a wireless communication transceiver;
 a processing system configured to separate the user data into a first Hybrid Automatic Repeat Request (HARQ) packet and a second HARQ packet, direct the wireless communication transceiver to wirelessly transmit the first HARQ packet with a preamble at a first modulation rate during a first HARQ time slot in a first HARQ frame;
 if a Negative Acknowledgement (NACK) is received from the wireless communication device for the first HARQ packet by the wireless communication transceiver, then the processing system is configured to direct the wireless communication transceiver to wirelessly retransmit the first HARQ packet having the preamble at a second modulation rate that is lower than the first modulation rate during a first HARQ time slot in a second HARQ frame wherein the first HARQ packet is not wirelessly retransmitted during the first HARQ frame; and
 if an Acknowledgement (ACK) is received from the wireless communication device for the first HARQ packet by the wireless communication transceiver, then the processing system is configured to direct the wireless communication transceiver to wirelessly transmit the second HARQ packet without any preamble during the first HARQ time slot in the second HARQ frame wherein the second HARQ packet is not wirelessly retransmitted during the second HARQ frame.

6. The wireless access node of 5 further comprising, if the ACK is received from the wireless communication device for the first HARQ packet by the wireless communication transceiver, then the processing system is configured to separate additional user data into additional HARQ packets and to direct the wireless communication transceiver to wirelessly transmit the additional HARQ packets without any preamble during first HARQ time slots in additional HARQ frames wherein the same ones of the additional HARQ packets are not wirelessly retransmitted during the same ones of the additional HARQ frames.

7. The wireless access node of claim 5 further comprising, if the ACK is received from the wireless communication device for the first HARQ packet having the preamble at a second modulation rate that is lower than the first modulation rate during a first HARQ time slot in a second HARQ frame by the wireless communication transceiver, then the processing system is configured to separate additional user data into additional HARQ packets and to direct the wireless communication transceiver to wirelessly transmit the additional HARQ packets without any preamble during first HARQ time slots in additional HARQ frames wherein the same ones of the additional HARQ packets are not wirelessly retransmitted during the same ones of the additional HARQ frames.

8. The wireless access node of claim 5 wherein the wireless access node comprises a Long Term Evolution (LTE) network access node.

\* \* \* \* \*